(12) United States Patent  (10) Patent No.: US 9,521,278 B1
Sekino  (45) Date of Patent: Dec. 13, 2016

(54) MAGNETIC DATA PROCESSING DEVICE AND PRINTING APPARATUS HAVING THE SAME

(71) Applicant: TOSHIBA TEC KABUSHIKI KAISHA, Tokyo (JP)

(72) Inventor: Toshiharu Sekino, Izu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/740,375

(22) Filed: Jun. 16, 2015

(51) Int. Cl.
  *G06F 15/00* (2006.01)
  *H04N 1/00* (2006.01)
  *G06K 7/08* (2006.01)

(52) U.S. Cl.
  CPC .......... *H04N 1/00339* (2013.01); *G06K 7/084* (2013.01); *H04N 2201/0094* (2013.01)

(58) Field of Classification Search
  USPC ....................................................... 358/1.13
  See application file for complete search history.

(56) References Cited

U.S. PATENT DOCUMENTS

| 6,069,776 A * | 5/2000 | Hasegawa ................ G11B 5/41 360/128 |
| 2006/0203067 A1 | 9/2006 | Sanada et al. |
| 2011/0083572 A1* | 4/2011 | Kaneoya .............. B41J 11/0015 101/425 |

FOREIGN PATENT DOCUMENTS

JP   H09034974 A   2/1997

* cited by examiner

*Primary Examiner* — Saeid Ebrahimi Dehkord
(74) *Attorney, Agent, or Firm* — Patterson & Sheridan, LLP

(57) ABSTRACT

A magnetic data processing device includes a magnetic head configured to read data from or write data to a magnetic stripe extending in a first direction on a medium, while moving in the first direction, a pad facing the magnetic head and extending in the first direction, and a controller configured to cause the pad to be in contact with the magnetic head and cause the magnetic head to move in the first direction while being in contact with the pad.

20 Claims, 11 Drawing Sheets

MAGNETIC DATA PROCESSING DEVICE AND PRINTING APPARATUS HAVING THE SAME

FIELD

Embodiments described herein relate generally to a magnetic data processing device which performs reading and writing of data with respect to a magnetic stripe attached to a booklet, and a printing apparatus having the magnetic data processing device.

BACKGROUND

One type of automated teller machines (ATM), used in financial institutions, print on a bankbook and the like. Some of the bankbooks include a stripe of a magnetic material, or a so-called magnetic stripe. Transaction data is stored in the magnetic stripe by causing the magnetic stripe and a magnetic head to contact and slide with each other. Since the magnetic head contacts the magnetic stripe when storing the transaction data, contaminants may be attached on a surface of the magnetic head during usage, which may cause a reading or writing error. Therefore, it would be desirable to remove the contaminants.

DETAILED DESCRIPTION

One or more embodiments are directed to provide a printing apparatus that cleans a magnetic head without using a special bankbook.

In general, according to one embodiment, a magnetic data processing device includes a magnetic head configured to read data from or write data to a magnetic stripe extending in a first direction on a medium, while moving in the first direction, a pad facing the magnetic head and extending in the first direction, and a controller configured to cause the pad to be in contact with the magnetic head and cause the magnetic head to move in the first direction while being in contact with the pad.

First Embodiment

Hereinafter, a printing apparatus according to a first embodiment will be described in detail with reference to the drawings.

Figure 1:
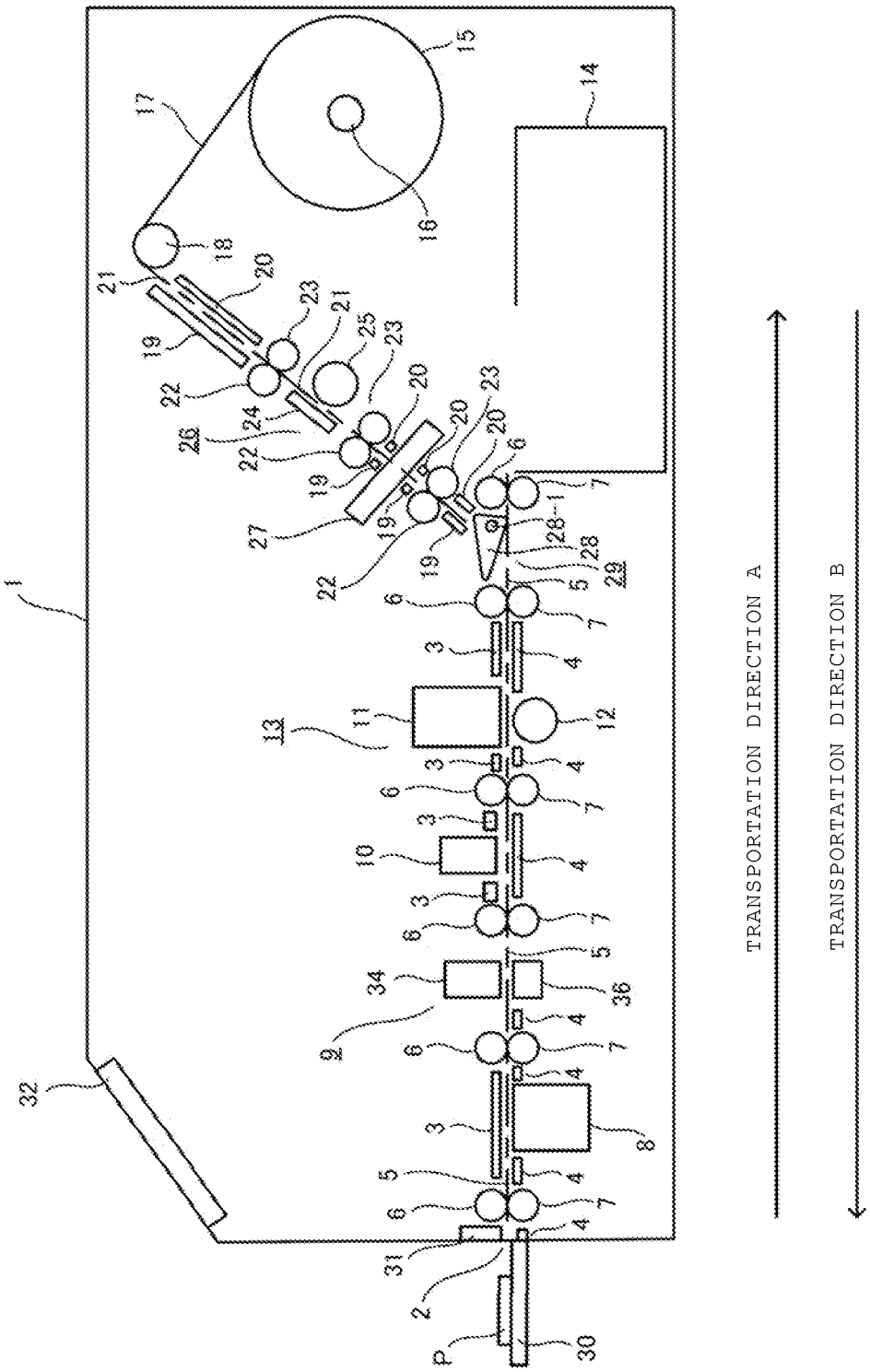
FIG. 1 illustrates a main portion of a printing apparatus according to a first embodiment.

FIG. 1 illustrates a main portion of the printing apparatus according to the first embodiment.

A multifunction printing apparatus 1 has a plurality of printing mechanisms. Even though the exemplary embodiment describes the printing apparatus having the plurality of printing mechanisms, the exemplary embodiment is not necessarily limited thereto as long as the printing apparatus has at least a printing mechanism handling a bankbook and the like. In the descriptions of the exemplary embodiment, the left side in FIG. 1 is referred to as a front side of the multifunction printing apparatus 1, and the right side is referred to as a rear side of the multifunction printing apparatus 1.

An insertion ejection port 2 is provided on the front side of the multifunction printing apparatus 1. Through the insertion ejection port 2, a booklet P such as a bankbook is inserted, and the booklet P or a cut-off roll sheet 15 (described below) such as a cut-form is ejected outside the multifunction printing apparatus 1 after printing. In the exemplary embodiment, a sheet in a rolled state is referred to as the roll sheet 15, and a portion of a roll sheet 15 which is cut off after being subjected to necessary printing is referred to as a cut-form C.

A collection tray 14 is provided on the rear side of the multifunction printing apparatus 1, thereby collecting and retaining the booklets P and the cut-forms C left behind by users.

First transportation upper guides 3 and first transportation lower guides 4 are provided extending from the insertion ejection port 2 to the collection tray 14. The booklet P or the cut-form C is transported through a first sheet transportation path 5 between the first transportation upper guides 3 and the first transportation lower guides 4. In the descriptions of the exemplary embodiment, a transportation direction in which the booklet P and the cut-form C are transported from the insertion ejection port 2 toward the collection tray 14 is referred to as a transportation direction A. Unless otherwise specifically denoted, the left side (the front side) in FIG. 1 is referred to as an upstream side, and the right side may be referred to as a downstream side in the descriptions.

A feed roller 6 and an idler roller 7 are provided on the downstream side of the insertion ejection port 2 in the transportation direction A. The feed roller 6 is rotatable by a motor (not illustrated), and the idler roller 7 is provided to face the feed roller 6 so as to form the first sheet transportation path 5 therebetween. The feed roller 6 and the idler roller 7 form a pair, thereby pinching and transporting the booklet P and the cut-form C. There are a plurality of pairs of the feed roller 6 and the idler roller 7 along the first sheet transportation path 5.

An alignment unit 8 is provided on the downstream side of the insertion ejection port 2 in the transportation direction A. The alignment unit 8 includes a sheet position detection sensor, a shutter, a sheet pinching mechanism, an alignment side end wall, and the like (not illustrated). The alignment unit 8 corrects skew and misalignment of the booklet P inserted from the insertion ejection port 2, so that the booklet P is in a preset position in a preset orientation.

A magnetic head 36 and a pressing pad 34 are provided on the downstream side of the alignment unit 8 in the transportation direction A. The magnetic head 36 performs reading and writing of information with respect to a magnetic stripe portion (not illustrated) which is provided on a rear side of the booklet P. The pressing pad 34 faces the magnetic head 36 with the first sheet transportation path 5 therebetween. The magnetic head 36 includes a head motor 37 (refer to FIG. 2) which moves the magnetic head 36 in a direction orthogonal to the transportation direction of the booklet P, and the pressing pad 34 includes a pad motor 35 (refer to FIG. 2) which causes the pressing pad 34 to make approach-separation movements in the direction of the first sheet transportation path 5, respectively. A magnetic stripe (MS) reading and writing section 9 includes the magnetic head 36, the head motor 37, the pressing pad 34, and the pad motor 35.

A page line finder (PLF) unit 10 is provided on the downstream side of the MS reading and writing section 9 in the transportation direction A. The PLF unit 10 includes a CCD image sensor and the like, thereby checking the currently open page and printed lines of the booklet P.

A dot head 11 and a platen 12, which faces the dot head 11 with the first sheet transportation path 5 therebetween, are provided on the downstream side of the PLF unit 10 in the transportation direction A. A first printing section 13 includes the dot head 11 and the platen 12, and printing is performed on the booklet P at the first printing section 13.

The collection tray 14 is provided on the downstream side of the first printing section 13 in the transportation direction A.

The roll sheet 15 is a sheet which is loaded on the rear side of the multifunction printing apparatus 1 and is wound around a winding shaft 16. The winding shaft 16 is rotatably supported by a frame (not illustrated).

Only a printing surface 17, that is, one surface of the roll sheet 15 includes thermal-sensitive layer which generates a color when being heated.

An idler roller 18 is provided in the multifunction printing apparatus 1 so as to apply uniform tension to the roll sheet 15.

A second transportation upper guide 19 and a second transportation lower guide 20 are provided extending from the idler roller 18 to the front side of the multifunction printing apparatus 1. The roll sheet 15 is transported through a second sheet transportation path 21 between the second transportation upper guide 19 and the second transportation lower guide 20. The second sheet transportation path 21 joins the first sheet transportation path 5 on the downstream side of the first printing section 13 in the transportation direction A. In the descriptions of the exemplary embodiment, a junction position of the first sheet transportation path 5 and the second sheet transportation path 21 is referred to as a junction section 29. A transportation direction in which the roll sheet 15 and the cut-form C are transported from the idler roller 18 toward the insertion ejection port 2 via the junction section 29 is referred to as a transportation direction B.

A feed roller 22 and an idler roller 23 are provided on the downstream side of the idler roller 18 in the transportation direction B. The feed roller 22 is rotatable by a motor (not illustrated), and the idler roller 23 is provided to face the feed roller 22 with the second sheet transportation path 21 therebetween. The feed roller 22 and the idler roller 23 are a pair, and pinch and transport the roll sheet 15. There are a plurality of pairs of the feed roller 22 and the idler roller 23 along the second sheet transportation path 21.

A thermal printing head 24 and a platen roller 25 are provided on the downstream side of the idler roller 18 in the transportation direction B. The platen roller 25 faces the thermal printing head 24 with the second sheet transportation path 21 therebetween and is rotatable by a motor (not illustrated). A second printing section 26 is configured to include the thermal printing head 24 and the platen roller 25, and printing is performed on the printing surface 17 of the roll sheet 15 at the second printing section 26.

A cutter 27 is disposed on the downstream side of the second printing section 26 in the transportation direction B. The cutter 27 includes a fixed blade and a movable blade (neither illustrated). A cutter motor (not illustrated) is driven to cause the movable blade to slide toward the fixed blade, thereby cutting the roll sheet 15 which is inserted into a slit (not illustrated) provided in the cutter 27. In this case, even though the cutter 27 is described as a so-called slide-type cutter of which the movable blade slides toward the fixed blade, the cutter is not limited thereto. The cutter may be a so-called rotary type which cuts a sheet by bringing the rotating movable blade into contact with the fixed blade.

The first sheet transportation path 5 and the second sheet transportation path 21 merges on the downstream side of the cutter 27 in the transportation direction B. A flapper 28 is provided in the junction section 29 which is the junction position. The flapper 28 is rotatable about a flapper rotary shaft 28-1. If the flapper 28 is turned counterclockwise, the second sheet transportation path 21 and the first sheet transportation path 5 communicate with each other. If the flapper 28 is turned clockwise, transportation is allowed through the first sheet transportation path 5 only from the insertion ejection port 2 to the collection tray 14.

An insertion ejection table 30 is provided in the vicinity of the insertion ejection port 2, which is disposed on the front side of the multifunction printing apparatus 1. The booklet P is temporarily placed on the insertion ejection table 30 when being inserted into the multifunction printing apparatus 1 and the booklet P or the cut-form C upon being ejected toward a user. A collection sensor 31 is provided at the insertion ejection port 2 so as to detect whether or not the booklet P or the cut-form C is taken by a user. A display unit 32 is provided on an upper surface of the multifunction printing apparatus 1 so as to display various states of the multifunction printing apparatus 1, including paper jam and running-out of paper.

Figure 2:
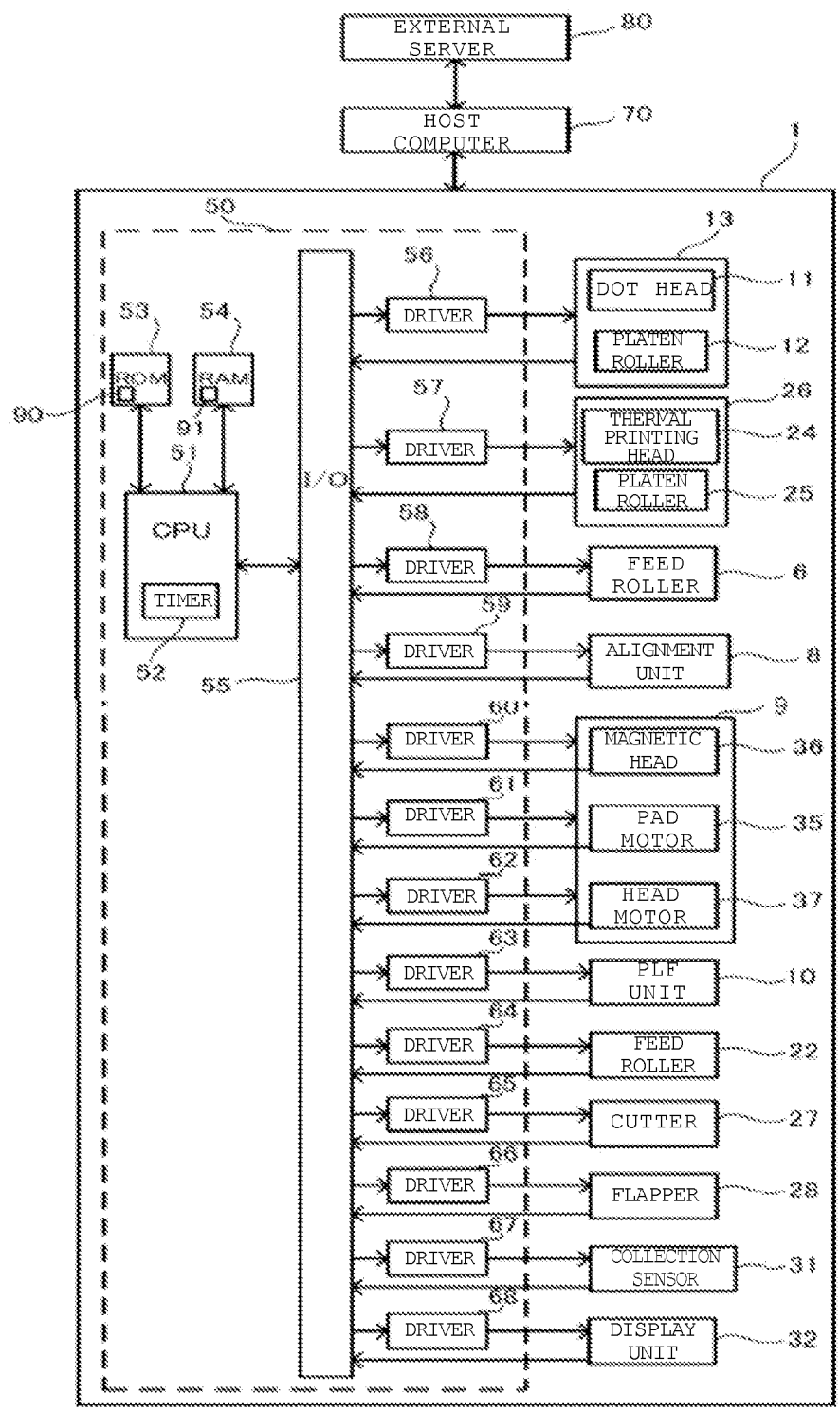
FIG. 2 is a block diagram of control units of the printing apparatus according to the first embodiment.

FIG. 2 is a block diagram of a control unit in the multifunction printing apparatus 1 according to the exemplary embodiment. A control unit 50 individually controls sheet transporting, printing, sheet cutting, sheet ejecting, sheet collecting, cleaning of the magnetic head, and displaying of status of the multifunction printing apparatus.

The control unit 50 is, for example, a microcomputer, which communicates with a host computer 70 and executes various controls. The host computer 70 is connected to an external server 80 such as financial institutions which manage information of deposits, savings, and the like.

A micro-processor unit (MPU) 51 of the control unit 50 carries out various controls and computations such as sheet transporting controls, printing controls, sheet cutting controls, sheet ejecting controls, and sheet collecting controls in accordance with programs.

The MPU 51 includes a timer 52, which performs time setting and time controlling.

A ROM 53 and a RAM 54 are included in the control unit 50 as a main storage unit which respectively stores control programs executed by the MPU 51 and data being processed for controlling and computing.

The ROM 53 is a read only memory which includes control programs and tables. The RAM 54 is a random access memory which stores data being processed for computing.

The ROM 53 includes a cleaning execution condition storage unit 90 which stores conditions for cleaning the magnetic head 36 (described below). The RAM 54 includes a cleaning execution counter unit 91 which stores information of elapsed days after cleaning (described below).

The control unit 50 includes an input output unit (I/O) 55 which fetches various input data from the host computer 70 and retrieves control outputs from the control unit 50 to the host computer 70. The I/O 55 is connected to the MPU 51, the ROM 53, and the RAM 54 through a bus.

A first driver 56, a second driver 57, a third driver 58, a fourth driver 59, a fifth driver 60, a sixth driver 61, a seventh driver 62, an eighth driver 63, a ninth driver 64, a tenth driver 65, an eleventh driver 66, a twelfth driver 67, and a thirteenth driver 68 are connected to the I/O 55, as units configured to retrieve the control outputs.

The first driver 56 supplies necessary driving outputs to the first printing section 13. The second driver 57 supplies necessary driving outputs to the second printing section 26. The third driver 58 supplies driving outputs to the feed roller 6. The fourth driver 59 supplies driving outputs to the alignment unit 8. The fifth driver 60 supplies driving outputs to the magnetic head 36. The sixth driver 61 supplies driving outputs to the pad motor 35. The seventh driver 62 supplies driving outputs to the head motor 37. The eighth driver 63 supplies driving outputs to the PLF unit 10. The ninth driver 64 supplies driving outputs to the feed roller 22. The tenth driver 65 supplies driving signals to the cutter 27. The eleventh driver 66 supplies driving signals to the flapper 28. The twelfth driver 67 supplies driving outputs to the collection sensor 31. The thirteenth driver 68 supplies driving signals to the display unit 32.

Hereinafter, operations of the multifunction printing apparatus 1 will be described with reference to FIGS. 1 and 3 to 6. The multifunction printing apparatus 1 is used in a state of being built in an automated teller machine (ATM) and the like. Here, operations of the multifunction printing apparatus 1 will be described with an example of making entries in an account book. The booklet P in the descriptions of the exemplary embodiment is considered to have a magnetic stripe M provided in a direction orthogonal to the transportation direction of the booklet P (refer to FIG. 4).

Figure 3:
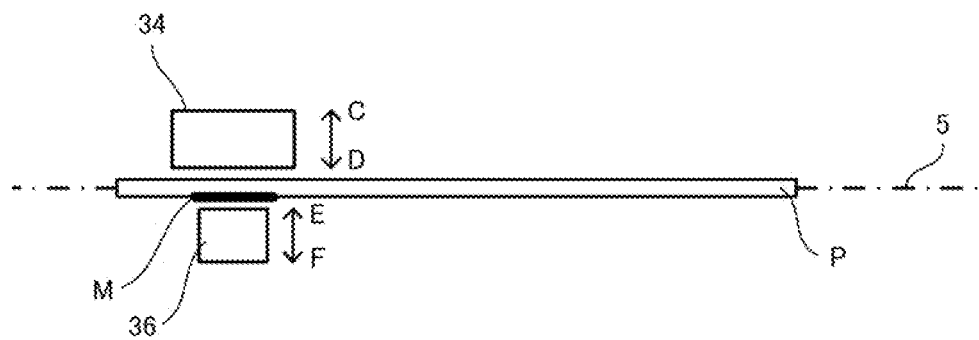
FIG. 3 is a cross-sectional view of a booklet, and a pressing pad and a magnetic head of the printing apparatus according to the first embodiment.
Figure 4:
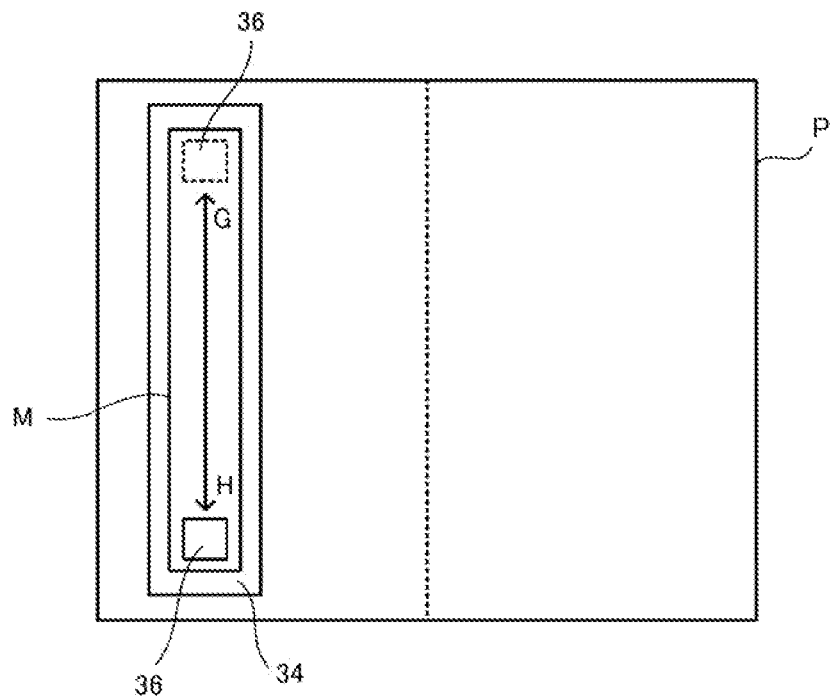
FIG. 4 is a top view of the booklet, the pressing pad, and the magnetic head in FIG. 4.
Figure 5A:
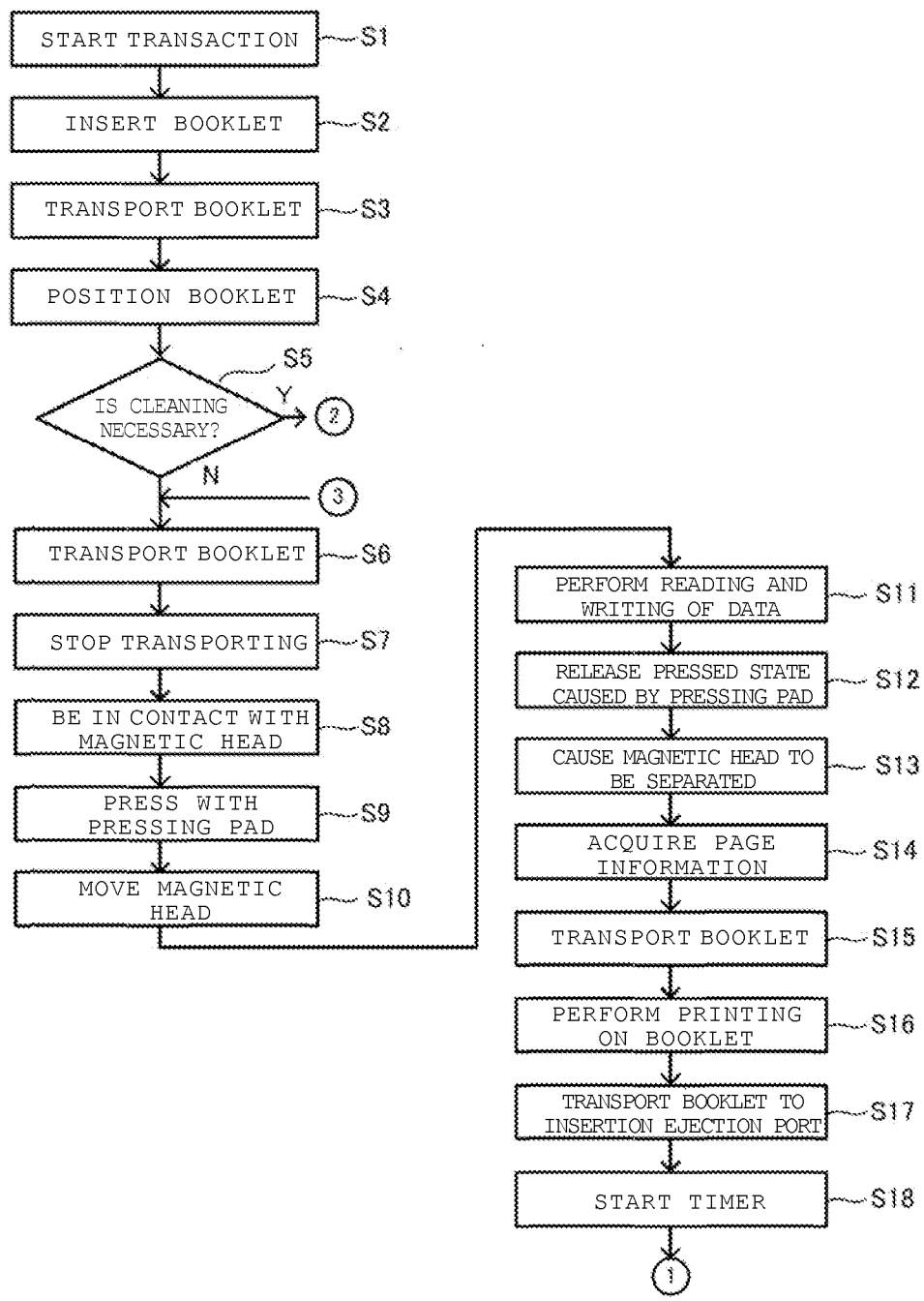
FIGS. 5A to 5C are flowcharts illustrating a method of a printing process on a booklet carried out by the printing apparatus according to the first embodiment.
Figure 5B:
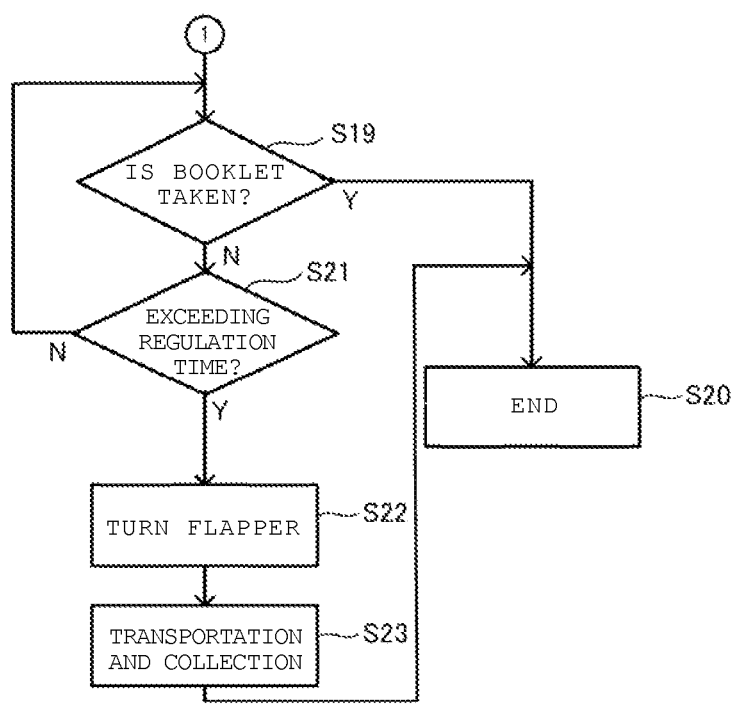
Figure 5C:
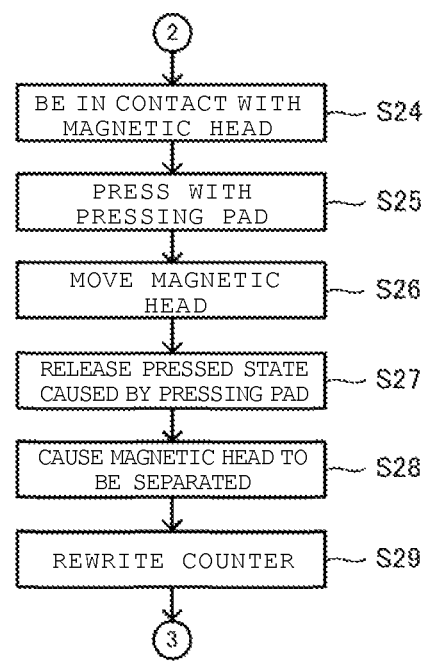
Figure 6A:
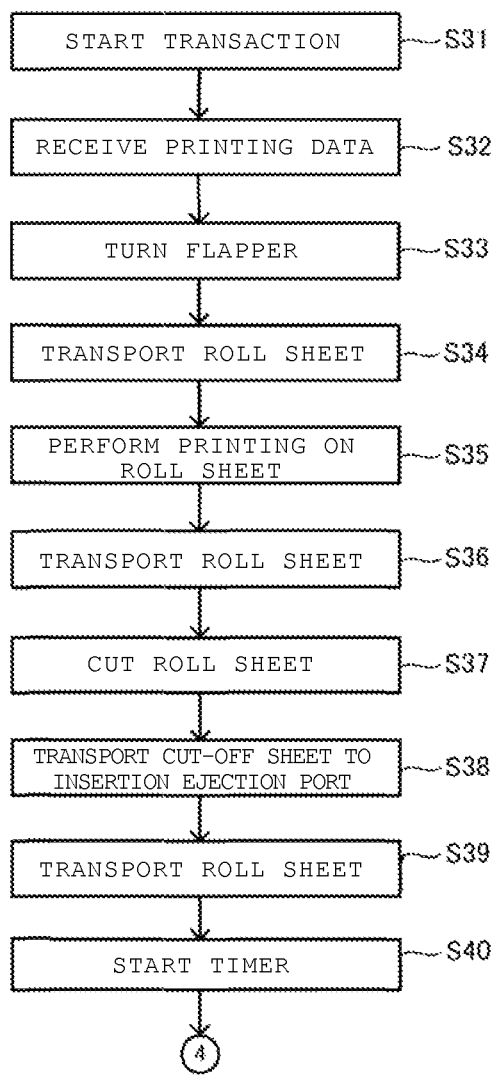
FIGS. 6A and 6B are flowcharts illustrating a method of a printing process on a roll sheet, carried out by the printing apparatus according to the first embodiment.
Figure 6B:
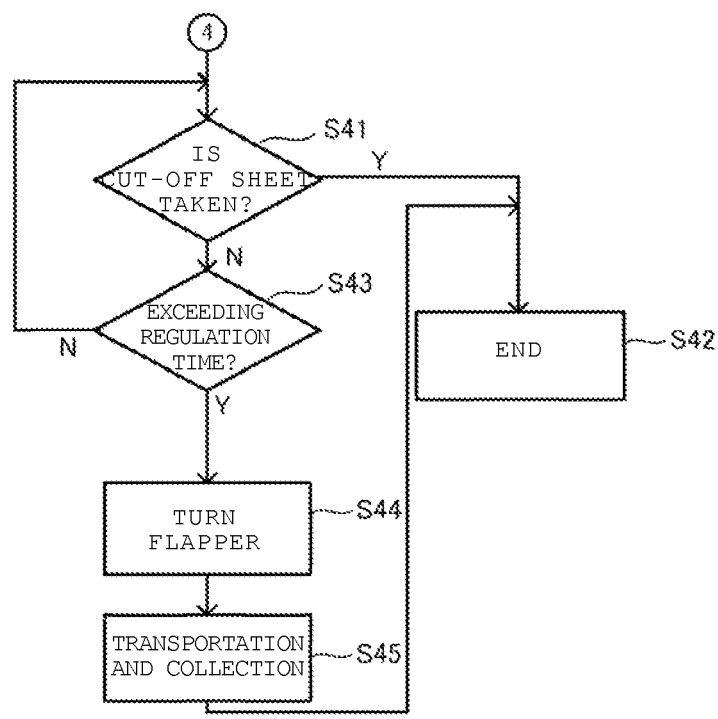

FIG. 3 is a cross-sectional view of a bankbook P, the pressing pad 34, and the magnetic head 36. FIG. 4 is a top view of the bankbook P, the pressing pad 34, and the magnetic head 36.

The pad motor 35 (not illustrated) enables the pressing pad 34 to move in a C-direction and a D-direction as illustrated in FIG. 3 with respect to the booklet P which is transported through the first sheet transportation path 5. The pressing pad 34 moves apart from the booklet P when moving in the C-direction, and the pressing pad 34 contacts the booklet P when moving in the D-direction. While being in the contact state, the pressing pad 34 is in a state of being pressed against the booklet P. The pressing pad 34 is in a state of being moved in the C-direction when reading and writing of data are not executed by the magnetic head 36. The head motor 37 (not illustrated) enables the magnetic head 36 to move in an E-direction and an F-direction as illustrated in FIG. 3 with respect to the booklet P which is transported through the first sheet transportation path 5. The magnetic head 36 contacts the booklet P when the magnetic head 36 is moved in the E-direction. The magnetic head 36 moves apart from the booklet P when the magnetic head 36 is moved in the F-direction. The magnetic head 36 is in a state of being moved in the F-direction when reading and writing of data are not executed by the magnetic head 36. The head motor 37 (not illustrated) moves the magnetic head 36 in a G-direction and an H-direction, which are orthogonal to the transportation direction of the booklet P as illustrated in FIG. 4. The magnetic head 36 moves from a position indicated by a solid line in FIG. 4 to a position indicated by a dotted line in order to carry out reading and writing of data, and then, the magnetic head 36 returns to the solid-lined position. The magnetic head 36 is in the position indicated by the solid line when reading and writing of data are not executed.

A user starts a transaction by pressing a button used when making entries in an account book on a screen (not illustrated) of an automated teller machine (S1). If the button for making entries in the account book is pressed, the control unit 50 instructs a user through the display unit 32 to open and insert the booklet P, that is, a bankbook through the insertion ejection port 2 of the multifunction printing apparatus 1.

The user opens the booklet P and inserts the booklet P through the insertion ejection port 2 in accordance with the instruction (S2). The multifunction printing apparatus 1 causes the feed roller 6 to rotate, thereby transporting the booklet P to the alignment unit 8 (S3) in cooperation with the idler roller 7. The alignment unit 8 uses the sheet position detection sensor, the shutter, the sheet pinching mechanism, and the alignment side end wall (not illustrated) to correct skew and misalignment of the booklet P transported to the alignment unit 8, thereby positioning the booklet P in a preset position and orientation (S4). Since an alignment mechanism thereof is a known mechanism, a detailed description thereof will be omitted.

Subsequently, the control unit 50 determines whether or not the magnetic head 36 is to be cleaned (S5). In determining whether or not cleaning is performed, the determination is made in accordance with data stored in the cleaning execution counter unit 91 in accordance with conditional formula stored in the cleaning execution condition storage unit 90. In the exemplary embodiment, the cleaning execution condition storage unit 90 is set to have a condition of performing shading every one-hundred-operation-day of the printing apparatus 1, and the cleaning execution counter unit 91 is set to have a condition of counting up one by one every operation day. The condition set to the cleaning execution condition storage unit 90 may be arbitrarily determined in advance by a user, such as execution on a monthly basis, or execution on a certain period of operation time basis. A type of data stored in the shading target counter unit 91 varies depending on the condition set to the cleaning execution condition storage unit 90.

When it is determined that the cleaning is not necessary (N in S5), the feed roller 6 is caused to rotate, thereby transporting the booklet P to the MS reading and writing section 9 (S6) in cooperation with the idler roller 7. The booklet P stops being transported at a position where the magnetic head 36 and the magnetic stripe M correspond to each other in the transportation direction of the booklet P (S7).

Subsequently, the magnetic head 36 moves in the E-direction so as to come into contact with the magnetic stripe M (S8). Moreover, the pressing pad 34 moves in the D-direction so as to cause the booklet P to be pressed by the pressing pad (S9). Accordingly, the booklet P is pinched between the magnetic head 36 and the pressing pad 34. Subsequently, after moving in the G-direction, the magnetic head 36 moves in the H-direction (S10), thereby performing reading and writing of data with respect to the magnetic stripe M (S11). Reading and writing of data are performed with respect to the external server 80 via the magnetic head 36.

After performing reading and writing of data, the pressing pad 34 moves in the C-direction, thereby releasing the pressed state caused by the pressing pad 34 (S12). Then, the magnetic head 36 moves in the F-direction, thereby causing the magnetic head 36 to be separated from the magnetic stripe M (S13).

Subsequently, while transporting the booklet P, the control unit 50 acquires page information of the booklet P using the PLF unit 10 provided on the downstream side of the MS reading and writing section 9 in the transportation direction A (S14). As described above, transaction information has been already acquired by the control unit 50 from the external server 80. The transaction information also includes information regarding a page where entries are to be printed in the booklet P. If a page which is not supposed to be printed is open when the information and the detected page acquired by the PLF unit 10 are compared, the booklet P is transported in the transportation direction B, thereby indicating a user so as to open the right page of the booklet and to reinsert. If a booklet page turning mechanism unit (not illustrated) is provided in the multifunction printing apparatus 1, the booklet P may be transported to the booklet page turning mechanism unit and transported to the position again after being turned to the right page.

Subsequently, after the booklet P is transported to the first printing section 13 (S15), printing is performed on the booklet P using the dot head 11 and a platen roller 12 (S16).

After completing printing on the booklet P, the control unit 50 causes the feed roller 6 to rotate so as to transport the booklet P in the transportation direction B in cooperation with the idler roller 7. The booklet P stops being transported at a position where the booklet P is placed on the insertion ejection table 30 and a portion of the booklet P protrudes outward from a front face 33 of the multifunction printing apparatus 1 (S17).

The collection sensor 31, which is a transmission-type sensor, is provided at the insertion ejection port 2. The collection sensor 31 may detect whether or not the booklet P is present at the position when the booklet P stops at the position protruding outward from the front face 33 of the multifunction printing apparatus 1.

When the booklet P stops at the position where a portion of the booklet P protrudes outward from the front face 33 of the multifunction printing apparatus 1, the collection sensor 31 detects that the booklet P is present at the position. Upon the detection, the timer 52 activates a timer to start time measurement (S18). In this case, a sensor signal of the collection sensor 31 is turned on. Setting time for a measurement performed by the timer 52 will be described below.

Subsequently, the control unit 50 checks whether or not the booklet P is taken by a user, every constant period of time (S19). Whether or not the booklet P is taken by a user is checked based on a detected signal of the collection sensor 31. When the booklet P is present, the signal of the collection sensor 31 is in an ON-state. However, if the booklet P is taken by a user, the detected signal of the collection sensor 31 is switched to an OFF-state. It is possible to check whether or not the booklet P is taken by a user, based on the switched state.

As it is checked that the booklet P is taken by the user (Y in S19), a process for the user ends (S20).

After checking whether or not the booklet P is taken by a user, every constant period of time (S19), if it is determined that the booklet P is not taken by the user (N in S19), the control unit 50 checks the time of the time measurement which is started when the booklet P stops at the position where a portion of the booklet P protrudes outward from the front face 33 of the multifunction printing apparatus 1, thereby checking whether or not the time exceeds a regulation time (S21). The aforementioned regulation time denotes a certain period of time when the booklet P is considered to be forgotten to be taken by a user, elapsed from the time when the booklet P stops at the position where a portion of the booklet P protrudes outward from the front face 33 of the multifunction printing apparatus 1, that is, when the booklet P is allowed to be taken by a user, for example, thirty seconds which is set in advance.

When the time does not exceed the regulation time (N in S21), since there is still a possibility that the booklet P is taken by a user, thereby repeating to check whether or not the booklet P is taken (S19).

After checking whether or not the time exceeds the regulation time (S21), when the time exceeds the regulation time (Y in S21), it is determined that the booklet P is likely to be forgotten to be taken by a user. Thus, the control unit 50 first turns the flapper 28 in a clockwise direction having the flapper rotary shaft 28-1 as a turning axis (S22). Accordingly, the first transportation path 5 and the collection tray 14 communicate with each other. Subsequently, the control unit 50 causes the feed roller 6 to rotate so as to transport the booklet P in the transportation direction A in cooperation with the idler roller 7 so that the booklet P is collected in the collection tray 14 (S23), thereby ending the process (S20).

When it is determined that cleaning is necessary (Y in S5), the magnetic head 36 moves in the E-direction so as to come into contact with the magnetic stripe M (S24). Then, the pressing pad 34 moves in the D-direction so as to cause the magnetic head 36 to be pressed by the pressing pad 34 (S25). A surface of the pressing pad 34 is a polishing surface. Subsequently, after moving in the G-direction, the magnetic head 36 moves in the H-direction (S26). As described above, since the surface of the pressing pad 34 is the polishing surface, a surface of the magnetic head 36 is polished and cleaned by moving in the G-direction and the H-direction.

After performing polishing and cleaning, the pressing pad 34 moves in the C-direction, thereby releasing the pressed state by the pressing pad (S27). Then, the magnetic head 36 moves in the F-direction, thereby causing the magnetic head 36 to be separated from the magnetic stripe M (S28). Subsequently, the control unit 50 rewrites the condition stored in the cleaning execution counter unit 91 as zero (S29).

Subsequently, while transporting the booklet P, the control unit 50 acquires page information provided in the booklet P using the PLF unit 10 provided on the downstream side of the MS reading and writing section 9 in the transportation direction A (S14). Since the process thereafter is the same as when it is determined that cleaning is not necessary, a description thereof will be omitted.

Hereinbefore, descriptions are given with the example of making entries in the booklet P. However, the printing apparatus 1 is not limited to execute only processing of the booklet P. There is another method to be used for outputting only a cut-form as a transaction statement without adopting the booklet P. Hereinafter, a case of printing a cut-form will be described with reference to FIGS. 6A and 6B.

When a transaction in which printing is performed on the roll sheet 15, which is to be issued as the cut-form C, starts (S31), printing data for printing on the roll sheet 15 is received (S32). Subsequently, the flapper 28 turns (S33) so as to cause the second transportation path 21 and the first transportation path 5 to communicate with each other. Subsequently, the feed roller 22 is caused to rotate in order to transport the roll sheet 15 (S34) so as to reach the second printing section 26, thereby performing printing on the printing surface 17 of the roll sheet 15 through the thermal printing head 24 (S35). Subsequently, the feed roller 22 is caused to rotate in order to transport the roll sheet 15 (S36), and then, the cutter 27 cuts the roll sheet 15 (S37). The cut-off roll sheet 15 is issued as the cut-form C to a user.

Subsequently, the multifunction printing apparatus 1 causes the feed roller 22 to rotate in order to transport the cut-form C in the transportation direction A to the position where the cut-form C is placed on the insertion ejection table 30 and a portion thereof protrudes outward from the front face 33 of the multifunction printing apparatus 1, in cooperation with the idler roller 23, and then, the roll sheet 15 stops being transported (S38). In addition, while the multifunction printing apparatus 1 transports the cut-form C to the insertion ejection port 2 in the transportation direction A, the feed roller 22 is caused to rotate. Thus, a main portion of the roll sheet 15 in a wound state is transported to a position on the upstream side of the second printing section 26 in the transportation direction B in cooperation with the idler roller 23 (S39). The reason for transporting the roll sheet 15 is to shorten an issuing time taken for the next issue of the cut-form by transporting a tip end portion of the roll sheet 15 to the position on the upstream side of the second printing section 26 in the transportation direction B preparing for the next issue of the cut-form C.

The collection sensor 31, which is a transmission-type sensor, is provided at the insertion ejection port 2. If the cut-form C stops at the position where a portion of the cut-form C protrudes outward from the front face 33 of the multifunction printing apparatus 1, the collection sensor 31 detects that the cut-form C is present at the position, and thus, the timer 52 activates the timer to start time measurement (S40).

Subsequently, the control unit 50 checks whether or not the cut-form C is taken by a user, every constant period of time (S41). If it is checked that the cut-form C is taken by the user (Y in S41), a process for the user ends (S42).

When it is determined that the cut-form C is not taken by the user (N in S41), the time of the time measurement is checked, thereby checking whether or not the time exceeds a regulation time (S43).

When the time does not exceed the regulation time (N in S43), it is repeatedly checked whether or not the cut-form C is taken away (S41). When the time exceeds the regulation time (Y in S43), the control unit 50 firstly turns the flapper 28 (S44). Accordingly, a section from the insertion ejection port 2 to the collection tray 14 is in a communicated state. Subsequently, the control unit 50 causes the feed roller 6 to collect the cut-form C in the collection tray 14 in cooperation with the idler roller 7 (S45), thereby ending the process (S42).

As described above, in the first embodiment, it is automatically determined whether or not the magnetic head 36 is to be cleaned. When the magnetic head 36 needs to be cleaned, the pressing pad 34 and the magnetic head 36 are caused to come into contact with each other without transporting the booklet, and then, the magnetic head 36 moves. The surface of the pressing pad 34 is the polishing surface. Accordingly, the surface of the magnetic head 36 is polished, thereby being cleaned. In this manner, since the surface of the generally used pressing pad 34 is the polishing surface, there is no need to periodically perform cleaning by inserting a cleaning sheet for polishing. Moreover, the pressing pad 34 is caused to retreat to a position being separated from the first sheet transportation path 5 when the booklet P is transported. Accordingly, even though the surface of the pressing pad 34 is the polishing surface, there is no chance to be in contact with the surface of the booklet P being transported through the first sheet transportation path 5, the booklet P is prevented from being damaged.

Second Embodiment

Figure 7A:
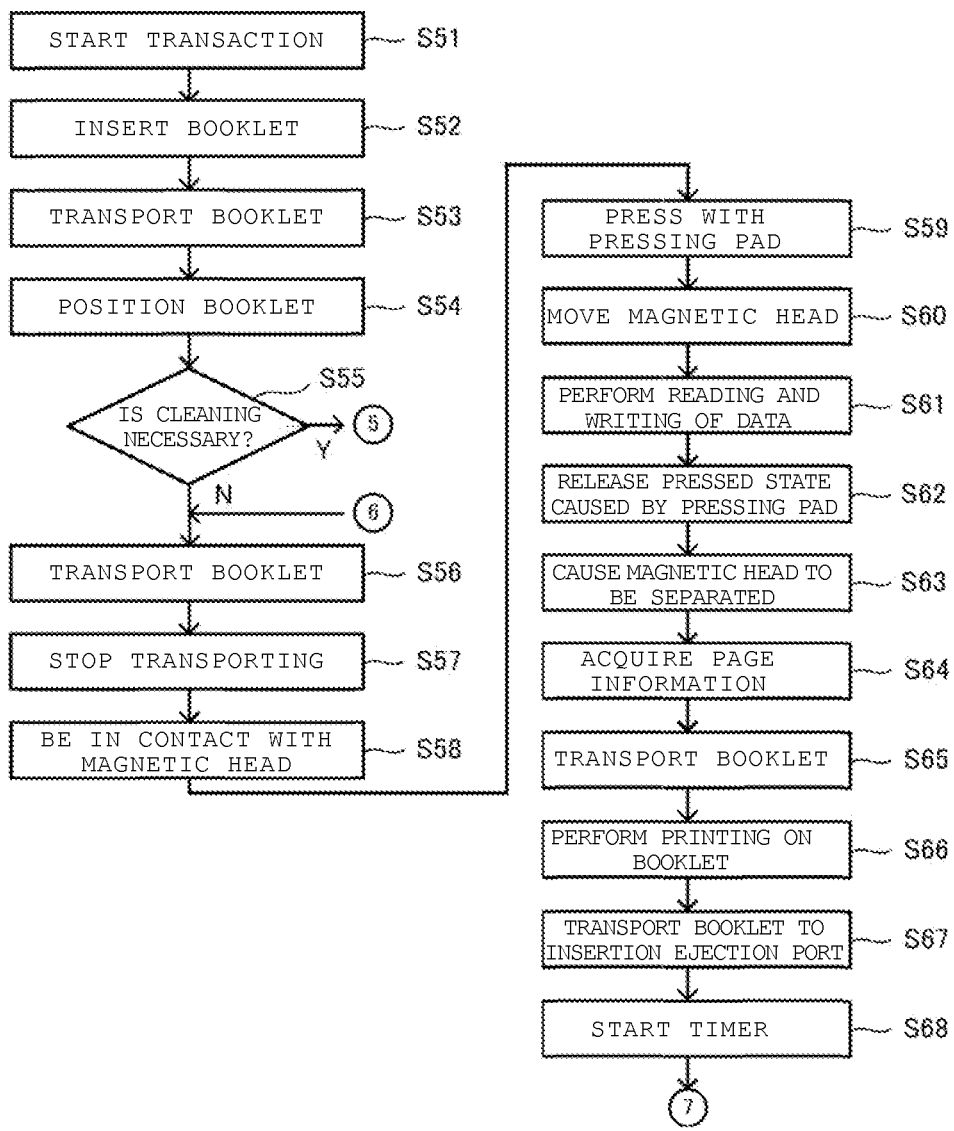
FIGS. 7A to 7C are flowcharts illustrating a method of a printing process on a booklet, carried out by the printing apparatus according to a second embodiment.
Figure 7B:
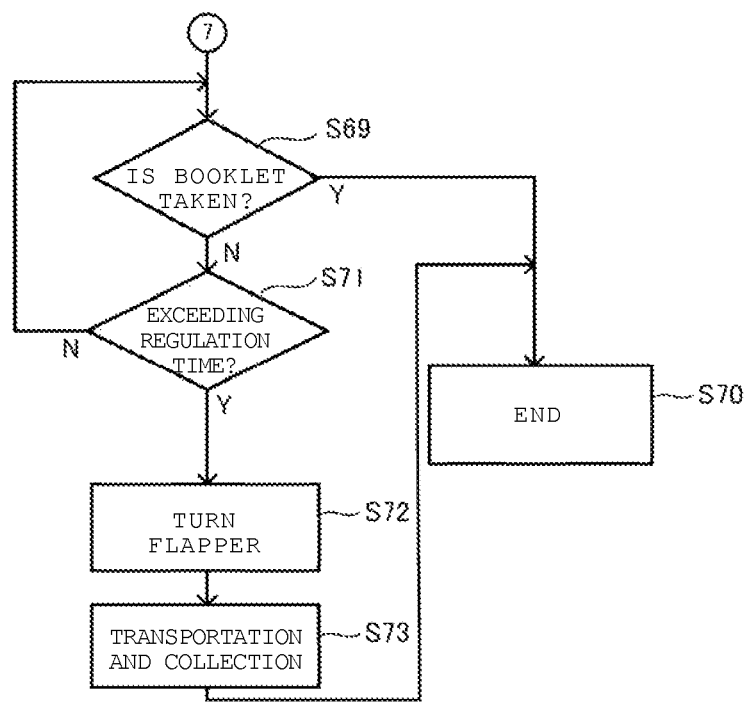
Figure 7C:
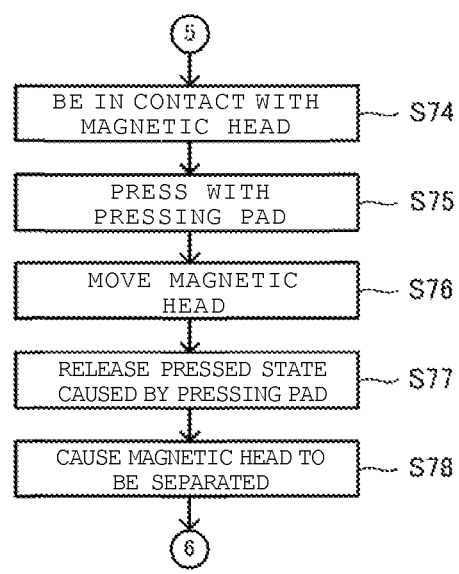

Hereinafter, the printing apparatus according to a second embodiment will be described in detail with reference to FIGS. 7A to 7C. Descriptions for the same portions as those in the first embodiment will be omitted.

In the second embodiment, a polishing condition change unit is included so as to change a polishing condition depending on the time of cleaning.

When an error occurs in the magnetic head 36 when performing reading and writing of data, it is necessary to immediately perform the cleaning. However, it is preferable to periodically perform the cleaning in order to prevent the magnetic head from causing an error. In the latter case, the cleaning is lightly performed after a short period has elapsed, and the cleaning needs to be extensively performed after a long period has elapsed.

In the second embodiment, an execution period information unit (not illustrated) is included in the ROM 53.

A user starts a transaction (S51). If the button for making entries in the account book is pressed, the control unit 50 instructs a user through the display unit 32 to open and insert the booklet P, that is, a bankbook, through the insertion ejection port 2 of the multifunction printing apparatus 1.

The user opens the booklet P and inserts the booklet P through the insertion ejection port 2 in accordance with the instruction (S52). The multifunction printing apparatus 1 causes the feed roller 6 to rotate, thereby transporting the booklet P to the alignment unit 8 in cooperation with the idler roller 7 (S53). The alignment unit 8 corrects skew and misalignment of the booklet P transported to the alignment unit 8, thereby positioning the booklet P in a preset position and orientation (S54).

Subsequently, the control unit 50 determines whether or not the magnetic head 36 is to be cleaned (S55).

When it is determined that cleaning is necessary (Y in S55), conditions for cleaning are set referring to the execution period information unit (not illustrated), the cleaning execution condition storage unit 90, and the cleaning execution counter unit 91, which are provided in the ROM 53. Here, it is assumed that conditions of one round-trip cleaning for every one-hundred day and two round-trip cleaning for every two-hundred day are stored in the execution period information unit.

The magnetic head 36 moves in the E-direction (S74). Then, the pressing pad 34 moves in the D-direction so as to cause the magnetic head 36 to be pressed by the pressing pad 34 (S75). Subsequently, after moving in the G-direction, the magnetic head 36 moves in the H-direction. In this case, if two hundred days elapsed, the magnetic head 36 is subjected to two round-trips (S76). Thereafter, polishing and cleaning is performed, and then, the pressing pad 34 moves in the C-direction, thereby releasing the pressed state by the pressing pad 34 (S77). Then, the magnetic head 36 moves in the F-direction, thereby causing the magnetic head 36 to be apart from the pressing pad 34 (S78). Since the processing after the magnetic head 36 is separated from the pressing pad 34 or the processing after it is determined that cleaning of the magnetic head is not necessary (N in S55) are the same as those in the first embodiment, descriptions thereof will be omitted.

As described above, in the second embodiment, the execution period information unit is provided, and the conditions of cleaning are changed in accordance with the time of cleaning. Accordingly, it is possible to perform an optimal cleaning. In the second embodiment, the number of movements of the magnetic head 36 is varied between the elapsed time of one-hundred day and the elapsed time of two-hundred day as an example. However, without being limited thereto, it is possible to change a pressing force of the pressing pad 34 or change a speed of the movement of the magnetic head 36.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the exemplary embodiments described herein may be made without departing from the spirit of the inventions. The accompanying claims and their equivalents are intended to cover such forms or modifications as would fall within the scope and spirit of the inventions.

What is claimed is:

1. A magnetic data processing device, comprising:
    a storage device that stores:
        a first predetermined elapsed time period,
        a second predetermined elapsed time period different from the first predetermined elapsed time period, and
        a current cleaning execution counter;
    a magnetic head configured to read data from or write data to a magnetic stripe extending in a first direction on a medium, while moving in the first direction;
    a pad facing the magnetic head and extending in the first direction; and
    a controller configured to:
        increment the current cleaning execution counter when a predetermined event occurs,
        determine whether the current cleaning execution counter is equal to either the first or second predetermined elapsed time period,
        if the current cleaning execution counter is determined to be equal to the first predetermined elapsed time period, perform a first magnetic head cleaning operation including causing the pad to be in contact with the magnetic head and causing the magnetic head to move in the first direction while being in contact with the pad, and
        if the current cleaning execution counter is determined to be equal to the second predetermined elapsed time period, perform a second magnetic head cleaning operation different from the first magnetic head cleaning operation, including causing the pad to be in contact with the magnetic head and causing the magnetic head to move in the first direction while being in contact with the pad.

2. The magnetic data processing device according to claim 1, further comprising:
    an actuator configured to move the pad towards the magnetic head.

3. The magnetic data processing device according to claim 1, further comprising:
    an actuator configured to move the magnetic head towards the pad.

4. The magnetic data processing device according to claim 1, further comprising:
    a conveying unit configured to convey the medium between the magnetic head and the pad, in a second direction that is different from the first direction.

5. The magnetic data processing device according to claim 1, wherein
    the pad has a polishing surface that contacts the magnetic head when cleaning the magnetic head.

6. The magnetic data processing device according to claim 1, wherein
    the controller is further configured to, while performing the first and second magnetic head cleaning operations, reciprocate the magnetic head along the first direction while being in contact with the pad for cleaning, and change the number of times of reciprocation depending on whether the first magnetic head cleaning operation or the second magnetic head cleaning operation is being performed.

7. The magnetic data processing device according to claim 1, wherein
    the controller is further configured to, while performing the first and second magnetic head cleaning operations, cause a pressing force between the magnetic head and the pad to be changed depending on whether the first magnetic head cleaning operation or the second magnetic head cleaning operation is being performed.

8. The magnetic data processing device according to claim 1, wherein
    the controller is further configured to, while performing the first and second magnetic head cleaning operations, change a moving speed of the magnetic head depending on whether the first magnetic head cleaning operation or the second magnetic head cleaning operation is being performed.

9. The printing apparatus according to claim 8, wherein
    the controller is further configured to, while performing the first and second magnetic head cleaning operations, reciprocate the magnetic head along the first direction while being in contact with the pad for cleaning, and change the number of times of reciprocation depending on whether the first magnetic head cleaning operation or the second magnetic head cleaning operation is being performed.

10. The printing apparatus according to claim 8, wherein
    the controller is further configured to, while performing the first and second magnetic head cleaning operations, cause a pressing force between the magnetic head and the pad to be changed depending on whether the first magnetic head cleaning operation or the second magnetic head cleaning operation is being performed.

11. The printing apparatus according to claim 8, wherein
    the controller is further configured to, while performing the first and second magnetic head cleaning operations, chance a moving speed of the magnetic head depending on whether the first magnetic head cleaning operation or the second magnetic head cleaning operation is being performed.

12. The printing apparatus according to claim 8, wherein the predetermined event is an elapsed time period from a recent magnetic head cleaning operation.

13. The printing apparatus according to claim 12, wherein the elapsed time period is an elapsed operation time of the magnetic data processing device since the recent magnetic head cleaning operation.

14. The magnetic data processing device according to claim 1, wherein the predetermined event is an elapsed time period from a recent magnetic head cleaning operation.

15. The magnetic data processing device according to claim 14, wherein the elapsed time period is an elapsed operation time of the magnetic data processing device since the recent magnetic head cleaning operation.

16. A printing apparatus comprising:
a printing unit configured to print an image on a medium having a magnetic stripe extending in a first direction thereon;
a conveying unit configured to convey the medium in a second direction different from the first direction;
a storage unit that stores:
   a first predetermined elapsed time period,
   a second predetermined elapsed time period, and
   a current cleaning execution counter;
a magnetic head configured to read data from or write data to the magnetic stripe, while the medium is conveyed in the first direction;
a pad facing the magnetic head and extending in the first direction; and
a controller configured to:
   increment the current cleaning execution counter when a predetermined event occurs,
   determine whether the current cleaning execution counter is equal to either the first or second predetermined elapsed time period,
   if the current cleaning execution counter is determined to be equal to the first predetermined elapsed time period, perform a first magnetic head cleaning operation including causing the pad to be in contact with the magnetic head and causing the magnetic head to move in the first direction while being in contact with the pad, and
   if the current cleaning execution counter is determined to be equal to the second predetermined elapsed time period, perform a second magnetic head cleaning operation different from the first magnetic head cleaning operation, including causing the pad to be in contact with the magnetic head and causing the magnetic head to move in the first direction while being in contact with the pad.

17. The printing apparatus according to claim 16, further comprising:
an actuator configured to move the pad towards the magnetic head.

18. The printing apparatus according to claim 16, further comprising:
an actuator configured to move the magnetic head towards the pad.

19. The printing apparatus according to claim 16, wherein the conveying unit is further configured to convey the medium between the magnetic head and the pad.

20. The printing apparatus according to claim 16, wherein the pad has a polishing surface that contacts the magnetic head when cleaning the magnetic head.

* * * * *